(12) United States Patent
Blevins

(10) Patent No.: US 10,272,829 B2
(45) Date of Patent: Apr. 30, 2019

(54) MULTICOLOR SAFETY LIGHT SYSTEM FOR VEHICLE

(71) Applicant: Henry Blevins, Leland, NC (US)

(72) Inventor: Henry Blevins, Leland, NC (US)

( * ) Notice: Subject to any disclaimer, the term of this patent is extended or adjusted under 35 U.S.C. 154(b) by 0 days.

(21) Appl. No.: 15/455,922

(22) Filed: Mar. 10, 2017

(65) Prior Publication Data
US 2017/0259732 A1    Sep. 14, 2017

Related U.S. Application Data

(60) Provisional application No. 62/306,449, filed on Mar. 10, 2016.

(51) Int. Cl.
| | | |
|---|---|---|
| *B60Q 1/34* | (2006.01) | |
| *B60Q 1/44* | (2006.01) | |
| *B60Q 1/50* | (2006.01) | |
| *B60Q 1/00* | (2006.01) | |
| *B60Q 1/26* | (2006.01) | |
| *B60Q 1/30* | (2006.01) | |
| *B60Q 1/38* | (2006.01) | |

(52) U.S. Cl.
CPC ............. *B60Q 1/50* (2013.01); *B60Q 1/0041* (2013.01); *B60Q 1/2607* (2013.01); *B60Q 1/268* (2013.01); *B60Q 1/302* (2013.01); *B60Q 1/38* (2013.01); *B60Q 1/441* (2013.01); *B60Q 1/444* (2013.01); *B60Q 2400/20* (2013.01)

(58) Field of Classification Search
CPC ............. F21Y 2105/12; F21W 2103/20; F21W 2103/35; F21W 2103/45; F21W 2107/10; B60Q 1/34; B60Q 1/44; B60Q 1/444; B60Q 1/46; B60Q 1/2607
See application file for complete search history.

(56) References Cited

U.S. PATENT DOCUMENTS

| | | | | |
|---|---|---|---|---|
| 2,538,146 | A * | 1/1951 | Compton | B60Q 1/2607 340/474 |
| 3,748,643 | A | 7/1973 | Jacobs | |
| 3,949,361 | A | 4/1976 | Replogle | |
| 4,808,968 | A * | 2/1989 | Caine | B60Q 1/302 340/479 |
| 5,642,094 | A | 6/1997 | Marcella | |
| 6,404,334 | B1 * | 6/2002 | Chao | B60Q 1/22 340/464 |
| 6,897,771 | B1 * | 5/2005 | Lodhie | B60Q 1/2607 340/464 |
| 6,902,307 | B2 * | 6/2005 | Strazzanti | B60Q 1/00 362/541 |
| 7,347,597 | B2 * | 3/2008 | French | B60D 1/60 280/164.1 |

(Continued)

*Primary Examiner* — Ismael Negron
(74) *Attorney, Agent, or Firm* — Global Intellectual Property Agency, LLC; Daniel Boudwin

(57) ABSTRACT

A light system includes a housing having a first row of red lights to signal a braking action, a second row of yellow lights to signal no braking or accelerating action, and a third row of green lights to signal an accelerating action, a first side member with a first group of direction lights placed on a first side of the housing to indicate an upcoming right turn, a second side member with a second group of direction lights placed on an opposing second side of the housing to indicate an upcoming left turn and a fastener to secure the system to a vehicle flat surface visible to surrounding motorists and pedestrians.

9 Claims, 4 Drawing Sheets

(56) References Cited

U.S. PATENT DOCUMENTS

| | | | |
|---|---|---|---|
| 7,674,026 B2* | 3/2010 | Uchida | B60Q 1/2607 |
| | | | 362/540 |
| 8,125,327 B2 | 2/2012 | Ognibene | |
| 9,010,975 B2* | 4/2015 | Norris | F21S 43/20 |
| | | | 362/545 |
| 9,221,392 B2* | 12/2015 | Chen | B60Q 1/46 |
| 9,637,191 B2* | 5/2017 | Lee | B62H 5/20 |
| 2010/0214113 A1* | 8/2010 | Chang | B60Q 1/2611 |
| | | | 340/815.45 |
| 2014/0049976 A1 | 2/2014 | Leason et al. | |
| 2016/0252227 A1* | 9/2016 | Van Den Broek | B60Q 1/2607 |
| | | | 362/485 |
| 2018/0058655 A1* | 3/2018 | Oh | F21S 43/15 |

\* cited by examiner

MULTICOLOR SAFETY LIGHT SYSTEM FOR VEHICLE

CROSS REFERENCE TO RELATED APPLICATIONS

This application claims the benefit of U.S. Provisional Application No. 62/306,449 filed on Mar. 10, 2016. The above identified patent application is herein incorporated by reference in its entirety to provide continuity of disclosure.

BACKGROUND OF THE INVENTION

The present invention relates to vehicle indicator light systems. More specifically, the present invention relates to vehicle indicator light systems that are configured to indicate whether a vehicle is accelerating, coasting, braking, or turning.

All street legal vehicles come equipped with basic indicator signals to convey to surrounding motorists and pedestrians the current and intended changes in motion the driver of a vehicle intends to make. Thus, if a driver depresses a brake pedal, the rear brake lights of a vehicle will illuminate, indicating to drivers behind them that they are slowing down. Likewise, if a driver activates a turn signal, a blinking light on either the left or right side of a vehicle is illuminated, expressing to those around the vehicle that the driver intends to move the vehicle in the indicated direction.

While these indicators are essential components of the safe operation of a vehicle, most vehicles lack visual indicators to convey that the driver is accelerating or that they are neither accelerating nor decelerating, otherwise known as coasting.

Although accelerating and coasting may not be thought of as vital information to convey to surrounding motorists and pedestrians, they can be crucial to the safety of the driver and others around them in certain circumstances. For example, while driving in heavy traffic, a driver will often coast until they must quickly apply the brake. A vehicle tailing the driver closely may not realize that the driver is coasting rather than accelerating, and thus may not anticipate a rapid deceleration, potentially leading to a dangerous and costly accident. Similarly, in low visibility conditions, such as heavy fog, it can be particularly difficult for motorists to identify each other, especially if the tail lights of a vehicle ahead are not activated. Accordingly, a device designed to convey additional information about the motion of a vehicle, such as the acceleration and coasting in addition to turning and braking actions, is desired.

SUMMARY OF THE INVENTION

In view of the foregoing disadvantages inherent in the known types of vehicle indicator systems now present in the prior art, the present invention provides a vehicle indication system wherein the same can be utilized for providing convenience for the user when wishing to convey when a vehicle is accelerating and coasting. The present system comprises a housing having three rows of lights. A top row of lights comprises a first color, a middle row of lights comprises a second color and a bottom row of lights comprises a third color. The colors may include red, yellow and green. The first row is configured to indicate when a vehicle is braking, a second row is configured to indicate when a vehicle is neither braking nor accelerating, and a third row is configured to indicate when a vehicle is accelerating.

Additionally, a first side member is disposed on a first side of the housing, and a second side member is disposed on an opposing second side, where each side member further comprises a directional indicator, such as a plurality of lights configured in an arrowhead shape. A first directional indicator points right, while an opposing second directional indicator points left. A fastener is secured to the housing and configured to affix it to a flat surface.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
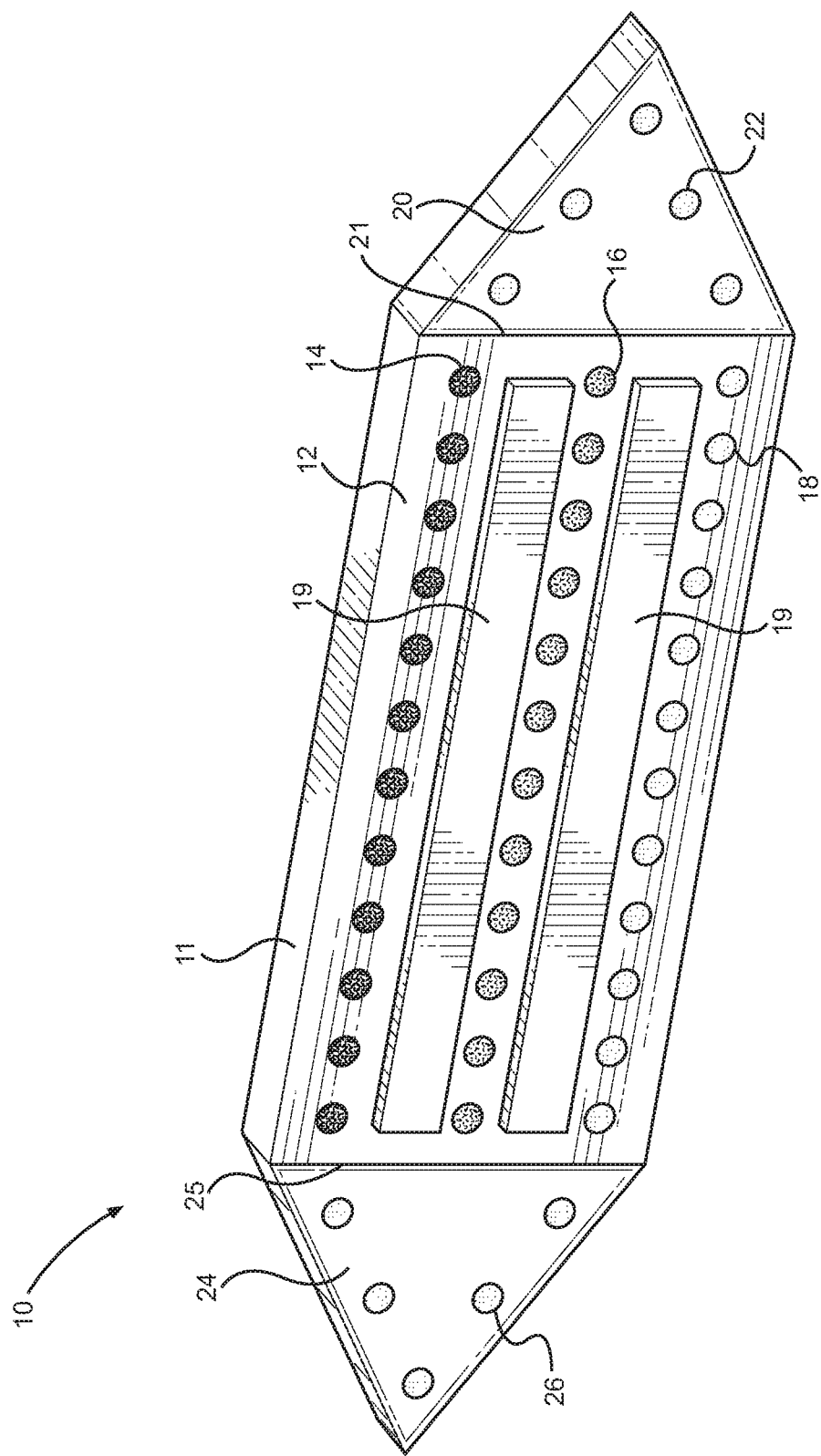
FIG. 1 shows a perspective view of the housing of the mountable vehicle safety light.

Reference is made herein to the attached drawings. Like reference numerals are used throughout the drawings to depict like or similar elements of the mountable vehicle safety light. The figures are intended for representative purposes only and should not be considered to be limiting in any respect.

Referring now to FIG. 1, there is shown a perspective view of the housing of the mountable vehicle safety light. The mountable vehicle safety light 10 comprises a housing 12 having a plurality of lights disposed on a front panel 11 thereof. The housing 12 comprises a top row 14, a middle 16, and a bottom row 18 of lights. In some embodiments of the mountable vehicle safety light 10, each row comprises a plurality of lights, while in other embodiments each row comprises a single elongated light. The top row 14 of lights comprises a first color of lights, the middle row 16 of lights comprises a second color of lights and the bottom row 18 of lights comprises a third color of lights. In some embodiments, the first color of the top row 14 is red, the second color of the middle row 16 is yellow and the third color of the bottom row 18 is green. A fastener 19 is secured to the front panel 12 and configured to affix the housing to a flat surface. In the illustrated embodiment, the fastener 19 is a strip of double sided tape. However, other types of fasteners may be utilized.

Additionally, a first side member 20 is disposed on a first side 21 of the housing 12, and a second side member 24 is disposed on an opposing second side 25 of the housing 12. Each side member 20, 24 further comprises a first directional indicator 22 and a second directional indicator 26. In some embodiments, the first directional indicator 22 and the second directional indicator 26 comprise a plurality of lights configured in an arrowhead shape. A first directional indicator 22 points right, while the opposing second directional indicator 26 points left.

Figure 2:
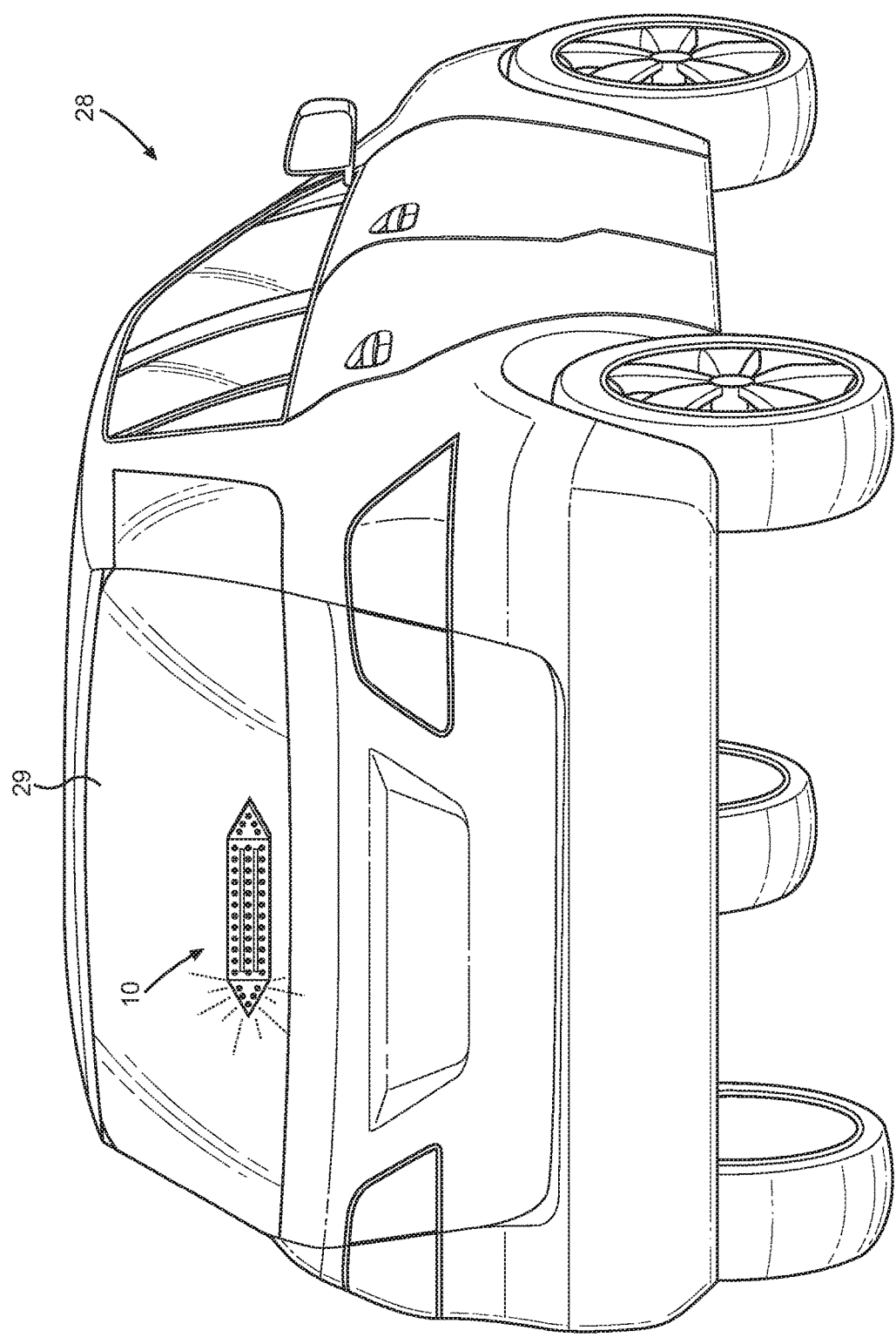
FIG. 2 shows a perspective view of the mountable vehicle safety light secured to the rear window of a vehicle.

FIG. 2 shows a perspective view of the mountable vehicle safety light 10 secured to the rear window of a vehicle 28. The mountable vehicle safety light 10 may be mounted onto a flat panel, such as a rear window pane 29 of a vehicle 28, via the fastener 19. The first row of lights is configured to activate a first color when a braking mechanism is engaged, a third row of lights activates a third color when an accelerator is engaged, and a second row of lights activates a second color when neither the braking mechanism nor the accelerator are engaged. Thus, when a driver is operating a vehicle in low visibility environments, such as in the middle of foggy conditions, the mountable vehicle safety light 10 alerts other motorists not only that the driver is braking or turning, but also if the driver is accelerating or coasting. This can be particularly useful when the weather or traffic conditions require the driver to quickly switch between accelerating, coasting and braking.

The direction indicators 22, 26 are operably connected to the turning signal system of a vehicle. Thus, if the right turning signal is activated, the first directional indicator 22 is likewise activated, lighting up and pointing right, while if the left turning signal is activated, the opposing second directional indicator 26 lights up and points left.

Figure 3:
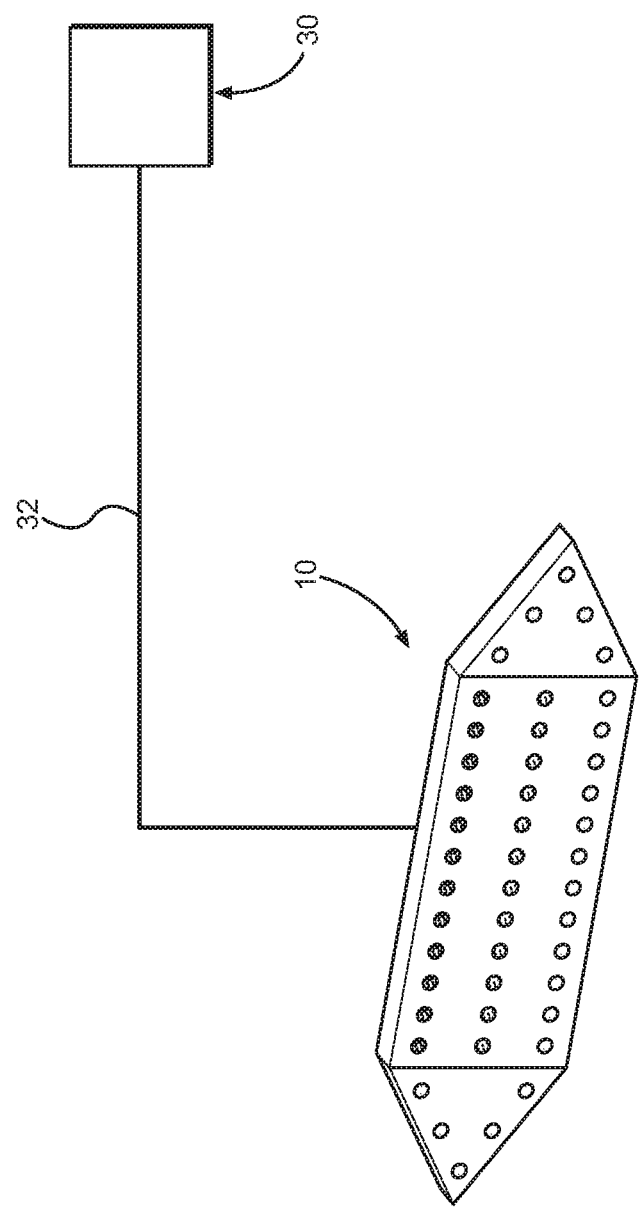
FIG. 3 shows a schematic diagram of the mountable vehicle safety light system.
Figure 4:
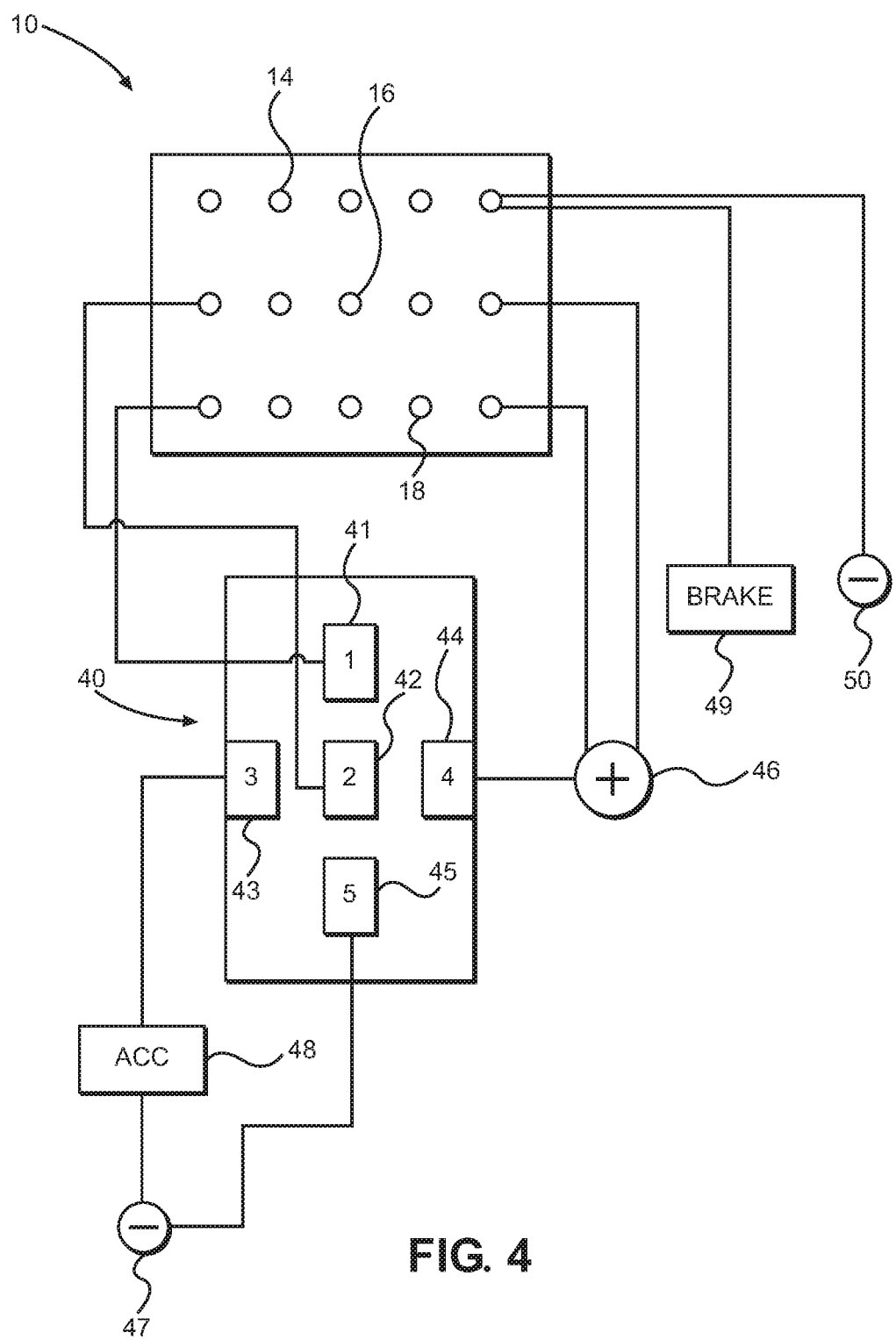
FIG. 4 shows a schematic view of one embodiment of the relay switch of the mountable vehicle safety light.

FIGS. 3 and 4 shows a schematic diagram of the mountable vehicle safety light system and a schematic view of one embodiment of the relay switch of the mountable vehicle safety light, respectively. The mountable vehicle safety light 10 is operably connected to the ignition and braking systems of a vehicle in order to detect if a driver is accelerating, coasting, or braking. Is some embodiments, the mountable vehicle safety light 10 is operably connected to a control box 30 via a cable 32 or wireless means. The control box 30 is configured to transmit accelerating or braking information to the mountable vehicle safety light 10. In some embodiments, the mountable vehicle safety light 10 is configured to connect to an on board diagnostic port of a vehicle.

In a further embodiment, the mountable vehicle safety light 10 further includes a relay switch 40 that is operably connected to a vehicle braking and accelerating system. For example, the relay switch 40 may comprise a double pole single throw style switch, as shown in FIG. 3. In one possible configuration, the top row 14 of lights is connected to the pre-existing braking system 49 of a vehicle and a negative terminal 50. The second row 18 of lights is connected to a positive terminal 46 and a second switch terminal 42. The third row 18 of lights is connected to the positive terminal 46 and a first switch terminal 41. The positive terminal 46 is connected to a fourth switch terminal 44. A third switch terminal 43 is operably connected to an acceleration calculating mechanism 48, such as a pressure gauge or motion sensor connected to a vehicle's gas pedal. A fifth switch terminal 45 is connected to a negative terminal 47. The natural state of the switch is to have a normally opened circuit connected to the second row 16 of lights, such that when neither the gas pedal nor the brake pedal are depressed, the second row 16 of lights is activated.

Thus, when the gas pedal is depressed, the third row 18 of lights is activated, and when the brake pedal is depressed, the first tow 14 of lights is activated. When neither the gas pedal nor the brake pedal is depressed, the second row 16 of lights is activated, indicating to surrounding motorists that the driver of the vehicle on which the mountable vehicle safety light 10 is installed is coasting and may potentially activate the braking system at any moment.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A multicolor safety lighting system for vehicle, comprising:
   a housing having a front panel, a first side and an opposing second side;
   three rows of lights disposed on the front panel and operably connected to a vehicle such that a first row of lights activates a first color light when a braking mechanism is engaged, a third row of lights activates a third color light when an accelerator is engaged, and a second row of lights activates a second color light when neither the braking mechanism nor the accelerator are engaged;
   a first side member disposed on the first side of the housing and comprising a first directional indicator;
   a second side member disposed on the opposing second side of the housing and comprises an opposing second directional indicator;
   wherein the housing is mountable to a flat surface via a fastener:
   wherein each of the first row of lights, the second row of lights, the third row of lights, the first directional indicator and the second directional indicator is an independent group from each other;
   wherein one of the first row of lights, the second row of lights and the third row of lights is activated simultaneously with one of the first directional indicator and the second directional indicator when the first directional indicator or the second directional indicator is activated, such that when a turn is indicated, the multicolor safety lighting system for vehicle will additionally indicate whether the braking mechanism is engaged using the first row of lights, the accelerator is engaged using the third row of lights, or neither the braking mechanism nor the accelerator are engaged using the second row of lights.

2. The multicolor safety lighting system for vehicle of claim 1, wherein the first row of lights comprise a red color, the second row of lights comprise a yellow color, and the third row of lights comprise a green color.

3. The multicolor safety lighting system for vehicle of claim 1, wherein the fastener comprises a strip of double sided tape, with a first side disposed on the front panel, and a second side configured to securably attach to a flat surface.

4. The multicolor safety lighting system for vehicle of claim 1, wherein the first directional indicator comprises a plurality of lights configured in an arrowhead shape pointing to the right of the housing and the second directional indicator comprises a plurality of lights configured in an arrowhead shape pointing to the left of the housing.

5. The multicolor safety lighting system for vehicle of claim 4, wherein the plurality of lights on the first directional indicator and the plurality of lights on the second directional indicator comprise a yellow color.

6. The multicolor safety lighting system for vehicle of claim 1, wherein the three rows of lights are operably connected to a relay switch.

7. The multicolor safety lighting system for vehicle of claim 6, wherein the relay switch is a single pole double throw relay.

8. The multicolor safety lighting system for vehicle of claim 7, wherein the relay switch is operably connected to a vehicle accelerator.

9. The multicolor safety lighting system for vehicle of claim 7, wherein the relay switch is operably connected to a vehicle braking mechanism.

* * * * *